United States Patent
Yun et al.

(10) Patent No.: US 9,577,817 B2
(45) Date of Patent: Feb. 21, 2017

(54) METHOD AND APPARATUS FOR PROVIDING IN-VEHICLE NETWORK TIME SYNCHRONIZATION USING REDUNDANT GRANDMASTER

(71) Applicant: Hyundai Motor Company, Seoul (KR)

(72) Inventors: Jin Hwa Yun, Seoul (KR); Kang Woon Seo, Goyang-si (KR); Dong Ok Kim, Goyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/663,236

(22) Filed: Mar. 19, 2015

(65) Prior Publication Data

US 2016/0127118 A1    May 5, 2016

(30) Foreign Application Priority Data

Nov. 3, 2014  (KR) .................. 10-2014-0151157

(51) Int. Cl.
*H04L 7/00* (2006.01)
*H04J 3/06* (2006.01)
*H04L 29/08* (2006.01)

(52) U.S. Cl.
CPC .......... *H04L 7/0016* (2013.01); *H04J 3/0641* (2013.01); *H04J 3/0667* (2013.01); *H04L 7/0008* (2013.01); *H04L 67/12* (2013.01)

(58) Field of Classification Search
CPC ....... H04L 7/0083; H04L 7/033; H04J 3/0688; H04J 3/0608; H03L 7/143
USPC ................................ 375/354–376
See application file for complete search history.

(56) References Cited

U.S. PATENT DOCUMENTS

| 6,704,892 B1* | 3/2004 | O'Brien | G01R 31/31725 327/163 |
| 6,983,009 B2* | 1/2006 | Lomp | H04B 1/707 370/342 |
| 7,251,256 B1* | 7/2007 | Barry | H04J 3/0658 370/503 |
| 7,495,609 B1* | 2/2009 | Woo | G01S 19/05 342/357.64 |
| 7,967,726 B2* | 6/2011 | Kim | F16H 61/143 477/107 |
| 8,446,990 B2* | 5/2013 | Liu | H04L 25/0212 375/259 |

(Continued)

FOREIGN PATENT DOCUMENTS

| JP | 2013-30932 A | 2/2013 |
| WO | 2014-139725 A1 | 9/2014 |

OTHER PUBLICATIONS

IEEE Standard for Local and metropolitan area networks, "Timing and Synchronization for Time-Sensitive Applications in Bridged Local Area Networks," Mar. 30, 2011.

(Continued)

*Primary Examiner* — James M Perez
(74) *Attorney, Agent, or Firm* — McDermott Will & Emery LLP

(57) ABSTRACT

A method for providing network time synchronization using a redundant grandmaster includes sensing a loss of the grandmaster. A sync message is generated according to a sensed result. The generated sync message is transmitted through a clock master port.

20 Claims, 6 Drawing Sheets

(56) References Cited

U.S. PATENT DOCUMENTS

| | | | | |
|---|---|---|---|---|
| 8,576,778 B2* | 11/2013 | Irvine | | H04J 3/0641 |
| | | | | 370/328 |
| 8,693,608 B2* | 4/2014 | Hadzic | | H04L 7/033 |
| | | | | 375/350 |
| 9,178,637 B2* | 11/2015 | Aweya | | H04J 3/0602 |
| 9,331,804 B2* | 5/2016 | Wong | | H04J 3/0638 |
| 9,450,911 B2* | 9/2016 | Cha | | H04L 41/0809 |
| 2005/0058149 A1* | 3/2005 | Howe | | H04L 47/10 |
| | | | | 370/428 |
| 2007/0041324 A1* | 2/2007 | Shenoi | | G06F 5/14 |
| | | | | 370/235 |
| 2009/0047913 A1* | 2/2009 | Kuru | | H04B 7/2693 |
| | | | | 455/76 |
| 2009/0231191 A1* | 9/2009 | Wu | | G04G 7/00 |
| | | | | 342/357.395 |
| 2010/0098202 A1 | 4/2010 | Lai et al. | | |
| 2010/0115047 A1* | 5/2010 | Briscoe | | G06F 1/12 |
| | | | | 709/208 |
| 2010/0220006 A1* | 9/2010 | Arab | | G04R 40/02 |
| | | | | 342/357.62 |
| 2011/0085540 A1* | 4/2011 | Kuwabara | | H04W 56/0015 |
| | | | | 370/350 |
| 2011/0135047 A1* | 6/2011 | Tournier | | G05B 19/0421 |
| | | | | 375/356 |
| 2012/0082188 A2* | 4/2012 | Nicholls | | G01S 19/25 |
| | | | | 375/145 |
| 2012/0195253 A1* | 8/2012 | Irvine | | H04J 3/0641 |
| | | | | 370/328 |
| 2013/0006519 A1* | 1/2013 | Doherty | | G01C 21/34 |
| | | | | 701/416 |
| 2013/0039220 A1* | 2/2013 | Ruffini | | H04J 3/0679 |
| | | | | 370/255 |
| 2013/0039359 A1* | 2/2013 | Bedrosian | | H04J 3/0697 |
| | | | | 370/350 |
| 2013/0107998 A1* | 5/2013 | Przada | | H04J 3/0688 |
| | | | | 375/362 |
| 2013/0157593 A1* | 6/2013 | Achanta | | H02H 1/0061 |
| | | | | 455/84 |
| 2013/0195253 A1* | 8/2013 | Andrews | | H01J 35/14 |
| | | | | 378/138 |
| 2013/0227172 A1* | 8/2013 | Zheng | | H04J 3/0641 |
| | | | | 709/248 |
| 2013/0234885 A1* | 9/2013 | Geier | | G01S 19/44 |
| | | | | 342/357.23 |
| 2013/0235889 A1* | 9/2013 | Aweya | | G06F 1/0328 |
| | | | | 370/516 |
| 2013/0268692 A1* | 10/2013 | Williams | | H04J 3/0632 |
| | | | | 709/248 |
| 2013/0282875 A1* | 10/2013 | Aweya | | H04J 3/0667 |
| | | | | 709/219 |
| 2014/0086375 A1* | 3/2014 | Secker | | H03L 7/18 |
| | | | | 375/356 |
| 2014/0269672 A1* | 9/2014 | Zampetti | | H04W 56/0015 |
| | | | | 370/350 |
| 2014/0281037 A1 | 9/2014 | Spada et al. | | |
| 2014/0348181 A1* | 11/2014 | Chandra | | H04J 3/0667 |
| | | | | 370/503 |
| 2015/0163000 A1* | 6/2015 | Aweya | | H04J 3/0602 |
| | | | | 370/519 |
| 2015/0215031 A1* | 7/2015 | Dalvi | | H04W 56/0015 |
| | | | | 370/324 |
| 2015/0222413 A1* | 8/2015 | Pietilainen | | G06F 1/14 |
| | | | | 709/248 |
| 2016/0072513 A1* | 3/2016 | Dickerson | | H03L 7/26 |
| | | | | 331/16 |
| 2016/0099803 A1* | 4/2016 | Achanta | | H04J 3/0638 |
| | | | | 375/355 |

OTHER PUBLICATIONS

Korean Office Action issued in Korean Application No. 10-2014-0151157 dated Aug. 4, 2015.

Extended European Search Report dated Mar. 7, 2016 issued in European Patent Application No. 15161050.8.

J. Younghwan, et al., "An efficient method of reselecting Grand Master in IEEE 902.1AS" The 20th Asia-Pacific Conference on Communication (APCC2014), IEEE, Oct. 1, 2014 (Oct. 1, 2014), pp. 303-308.

Hyung-Taek Lim, et al., "IEEE 802.1AS time synchronization in a switched Ethernet based in-car network," Vehicular Networking Conference (VNC), 2011 IEEE, IEE Nov. 14, 2011, pp. 147-154.

Korean Notice of Allowance issued in Application No. 10-2014-0151157, dated Feb. 5, 2016.

* cited by examiner

FIG. 1 (Related Art)

| | | Octets | |
|---|---|---|---|
| 8 7 6 5 | 4 3 2 1 | | |
| transportSpecific | messageType | 1 | 0 |
| reserved | versionPTP | 1 | 1 |
| messageLength || 2 | 2 |
| domainNumber || 1 | 4 |
| reserved || 1 | 5 |
| flags || 2 | 6 |
| correctionField || 8 | 8 |
| reserved || 4 | 16 |
| sourcePortIdentity || 10 | 20 |
| sequenceId || 2 | 30 |
| control || 1 | 32 |
| logMessageInterval || 1 | 33 |

FIG. 2 (Related Art)

Bits

| | Octets | Offset |
|---|---|---|
| 8 7 6 5 4 3 2 1 | | |
| header | 34 | 0 |
| reserved | 10 | 34 |
| currentUtcOffset | 2 | 44 |
| reserved | 1 | 46 |
| grandmasterPriority1 | 1 | 47 |
| grandmasterClockQuality | 4 | 48 |
| grandmasterPriority2 | 1 | 52 |
| grandmasterIdentity | 8 | 53 |
| stepsRemoved | 2 | 61 |
| timeSource | 1 | 63 |
| path trace TLV | 4+8N | 64 |

METHOD AND APPARATUS FOR PROVIDING IN-VEHICLE NETWORK TIME SYNCHRONIZATION USING REDUNDANT GRANDMASTER

CROSS REFERENCE TO RELATED APPLICATION

This application claims the benefit of priority to Korean Patent Application No. 10-2014-0151157, filed on Nov. 3, 2014, which is hereby incorporated by reference as if fully set forth herein.

TECHNICAL FIELD

The present disclosure relates to a method for providing time synchronization in an in-vehicle network, and more particularly, to a method and apparatus for providing network time synchronization using a redundant grandmaster in an audio/video bridging (AVB) network.

BACKGROUND

Currently released vehicles have a variety of electronic controllers which are configured with an in-vehicle network for mutual communication among these electronic controllers for improving user convenience and safety.

However, as in-vehicle electronic controllers have been gradually increasing in number, which are capable of interacting with various external devices, problems related to overload of an existing vehicle network and increase in costs due to wiring harnesses have been raised.

In addition, as customer demands for high-quality audio/video (A/V) data and applications using A/V data increase, bandwidth extension is necessary.

As such, a large number of vehicle manufacturers use Ethernet for in-vehicle networking and further have developed Ethernet-based around view monitoring (AVM) systems.

The Ethernet network generally includes a plurality of local area networks (LANs) and a plurality of bridges for connection among the LANs.

Ethernet includes a plurality of nodes for competitively accessing a common medium using a Carrier Sense Multiple Access/Collision Detection (CSMA/CD) protocol. However, a CSMA/CD scheme provides the same priority to all traffic, thus allowing the plurality of nodes to access to any traffic through competition, and thus is not appropriate for transmission of multimedia data which is sensitive to propagation time delay, e.g., A/V data.

Accordingly, Ethernet uses a technology of synchronizing timings of all network nodes so as to transmit the multimedia data.

Currently, a standard for audio/video bridging (AVB) has been developed by IEEE 802.1/1722. The AVB standard provides a quality-guaranteed transmission technology for appropriate transmission of a multimedia stream, e.g., an A/V stream, in a LAN.

As described above, according to a conventional LAN, Ethernet basically uses a frame-based packet switching technology which is not an efficient and quality-guaranteed transmission technology. To solve this problem, synchronous Ethernet, residential Ethernet, or the like have been developed by IEEE 802.2. Currently, a research on a method for implementing a similar technology on a bridge based on the conventional non-synchronous packet switching technology has been developing by IEEE 802.1/1722.

Basically, a technology for enabling synchronous traffic transmission using conventional Ethernet bridges which perform packet switching and a core thereof is to synchronize clocks of bridges within a certain geographic range. If the clocks of the bridges are synchronized, a certain-sized Ethernet frame can be accurately transmitted among the bridges with a certain time interval at a desired time. This concept is applied to a bridge mesh which can be used as an infrastructure for stably delivering synchronous traffic.

A time synchronization method among devices according to IEEE 802.1AS is a method for synchronizing a transmitter and a receiver using a time stamp including time synchronization information. In this method, a grandmaster (GM) for providing a reference time for time synchronization is selected among devices in a network, a local time of the selected grandmaster is transmitted to other devices using an announce message, and thus, the other devices use the local time of the grandmaster as a reference time. At this time, the grandmaster transmits the announce message to all other devices to transfer signal information indicating the presence of the grandmaster and a comparative value indicating suitability as a reference time providing device.

That is, the grandmaster is a top node of the IEEE 802.1/1722 time tree and periodically transmits current time information to sub nodes.

IEEE 802.1AS defines a procedure for determining a grandmaster and acquiring time synchronization, a procedure for discovering all devices on a network and controlling access to links using a plurality of control messages, and a procedure for persistently checking link states using the announce message.

However, IEEE 802.1AS cannot rapidly and efficiently acquire time synchronization when a grandmaster is lost (e.g., when the grandmaster is rebooted due to a system failure).

SUMMARY

The present disclosure is directed to a method and apparatus for providing in-vehicle network time synchronization using a redundant grandmaster which substantially obviate one or more problems due to limitations and disadvantages of the related art.

An aspect of the present inventive concept provides a method and apparatus for providing in-vehicle network time synchronization using a redundant grandmaster, by which initialization of a reference time when a preconfigured grandmaster is rebooted may be prevented.

Another aspect of the present inventive concept provides a method and apparatus for providing in-vehicle network time synchronization using a redundant grandmaster, by which a nearest bridge to a grandmaster may operate as a redundant grandmaster when the grandmaster is rebooted, and thus, a new grandmaster selection procedure may be omitted.

Additional advantages, objects, and features of the disclosure will be set forth in part in the description which follows and in part will become apparent to those having ordinary skill in the art upon examination of the following or may be learned from practice of the invention. The objectives and other advantages of the disclosure may be realized and attained by the structure particularly pointed out in the written description and claims hereof as well as the appended drawings.

According to an exemplary embodiment of present inventive concept, a method for providing time synchronization by a bridge cooperating with a grandmaster includes sensing a loss of the grandmaster. A sync message is generated according to a sensed result. The generated sync message is transmitted through a clock master port.

The loss of the grandmaster may be sensed if the sync message is not received from the grandmaster for a time corresponding to a predetermined number of sync message transmission cycles.

The bridge may wait for a sync message transmission wait time before generating the sync message if the loss is sensed.

The sync message transmission wait time may be determined as a sum of the time corresponding to the predetermined number of the sync message transmission cycles of the grandmaster and a predetermined multiple of a correction field value most recently received from the grandmaster.

The sync message may be generated based on an internal reference time of the bridge.

The method may further include generating time correction information using the generated sync message and a follow up message most recently received from the grandmaster.

The method may further include generating the follow up message including the generated time correction information. The generated follow up message is transmitted through the clock master port. The generated follow up message may be transmitted after the generated sync message is transmitted.

The time correction information may include at least one of time stamp information, correction field information, and neighbor rate ratio information.

An operation mode of the bridge may be switched from a normal bridge mode to a redundant grandmaster mode if the loss is sensed.

The operation mode may be switched back to the normal bridge mode if the sync message is received from the grandmaster in the redundant grandmaster mode.

The sync message may be generated and transmitted in the redundant grandmaster mode in a cycle less than the sync message transmission cycles of the grandmaster.

According to another exemplary embodiment of the present inventive concept, a bridge using a grandmaster includes a sync message reception module configured to sense a loss of the grandmaster. A sync message generation module is configured to generate a sync message according to a sensed result, and to transmit the generated sync message through a clock master port.

The loss of the grandmaster may be sensed if the sync message is not received from the grandmaster for a time corresponding to a predetermined number of sync message transmission cycles.

The bridge may wait for a sync message transmission wait time before generating the sync message if the loss is sensed.

The sync message transmission wait time may be determined as a sum of the time corresponding to the predetermined number of the sync message transmission cycles of the grandmaster and a predetermined multiple of a correction field value which is a most recently received value from the grandmaster.

The sync message may be generated based on an internal reference time of the bridge.

The bridge may further include a reference time correction module configured to generate time correction information using the generated sync message and a follow up message most recently received from the grandmaster.

The sync message generation module may further generate a follow up message including the generated time correction information, and means for transmit the generated follow up message through the clock master port. The generated follow up message may be transmitted after the generated sync message is transmitted.

The time correction information may include at least one of time stamp information, correction field information, and neighbor rate ratio information.

An operation mode of the bridge may be switched from a normal bridge mode to a redundant grandmaster mode if the loss is sensed.

The operation mode may be switched back to the normal bridge mode if the sync message is received from the grandmaster in the redundant grandmaster mode.

The sync message may be generated and transmitted in the redundant grandmaster mode in a cycle less than the sync message transmission cycles of the grandmaster.

It is to be understood that both the foregoing general description and the following detailed description of the present inventive concept are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the inventive concept and together with the description serve to explain the principle of the invention.

FIG. 1 is a table showing a structure of a message header defined in IEEE 802.1AS according to the related art.

FIG. 2 is a table showing the structure of an announce message defined in IEEE 802.1AS according to the related art.

DETAILED DESCRIPTION

Figure 3:
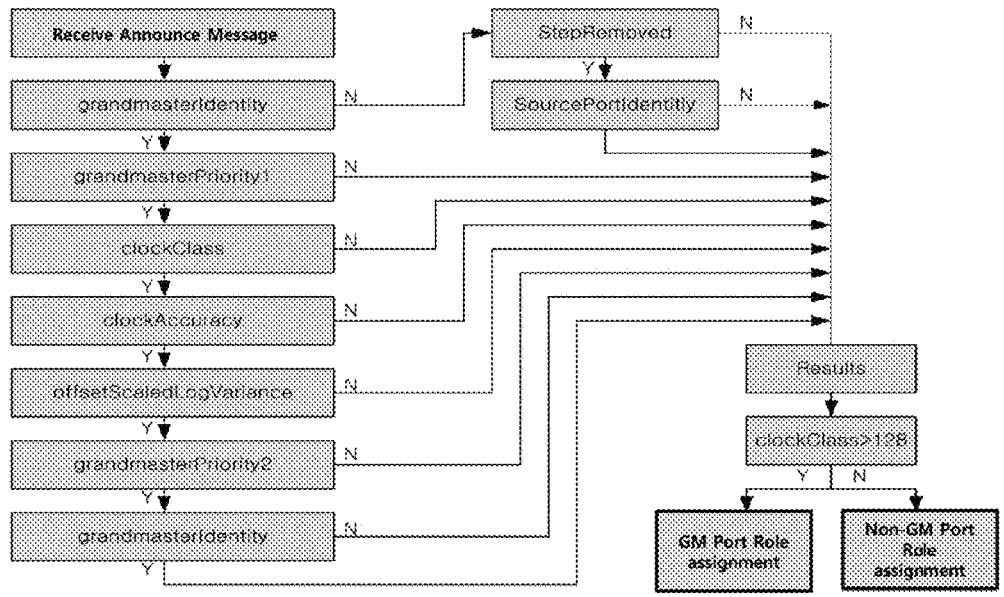
FIG. 3 is a flowchart for describing an announce message comparison procedure and a port assignment method in IEEE 802.1AS according to the related art.

Reference will now be made in detail to the exemplary embodiments of the present inventive concept, examples of which are illustrated in the accompanying drawings. The suffixes "module" and "unit" of elements herein are used for convenience of description and thus can be used interchangeably and do not have any distinguishable meanings or functions.

Although all elements constituting the embodiments of the present inventive concept are described as being integrated into a single one or as being operated as a single one, the present inventive concept is not necessarily limited to such embodiments. According to embodiments, all of the elements may be selectively integrated into one or more and be operated as one or more within the object and scope of the present inventive concept. Each of the elements may be implemented as independent hardware. Alternatively, some or all of the elements may be selectively combined into a computer program having a program module performing some or all functions combined in one or more pieces of hardware. Code and code segments constituting the computer program may be easily reasoned by those skilled in the art to which the present disclosure pertains. The computer program may be stored in a computer readable media such that the computer program is read and executed by a computer to implement embodiments of the present inventive concept. Computer program storage media may include magnetic recording media, optical recording media, and carrier wave media.

The terms "comprises", "includes", or "has" described herein should be interpreted not to exclude other elements but to further include such other elements since the corresponding elements may be inherent unless mentioned otherwise. All terms including technical or scientific terms have the same meanings as generally understood by a person having ordinary skill in the art to which the present disclosure pertains unless mentioned otherwise. Generally used terms, such as terms defined in a dictionary, should be interpreted to coincide with meanings of the related art from the context. Unless obviously defined in the present disclosure, such terms are not to be interpreted as ideal or excessively formal meanings.

It will be understood that, although the terms first, second, A, B, (a), (b), etc. may be used herein to describe various elements of the present disclosure, these terms are only used to distinguish one element from another element and essential, order, or sequence of corresponding elements are not limited by these terms. It will be understood that when one element is referred to as being "connected to", "combined with", or "coupled to" another element, one element may be "connected to", "combined with", or "coupled to" another element via a further element although one element may be directly connected or coupled to another element.

A time synchronization method defined in IEEE 802.1AS according to the related art is now described in brief with reference to FIGS. 1 to 5.

IEEE 802.1AS defines a header structure of messages used for network time synchronization, the structure of an announce message, a grandmaster (GM) selection method for providing reference time information, a port role assignment method of a switch, etc.

FIG. 1 is a table showing a structure of a message header defined in IEEE 802.1AS according to the related art, and FIG. 2 is a table showing a structure of an announce message defined in IEEE 802.1AS according to the related art.

The announce message may include information necessary to select a grandmaster, e.g., currentUtcOffset, grandmasterPriority1, grandmasterPriority2, grandmasterClockQuality and grandmasterIdentity. Hereinafter, for convenience of explanation, the information necessary to select a grandmaster is called reference time information.

FIG. 3 is a flowchart for describing an announce message comparison procedure and a port assignment method in IEEE 802.1AS according to the related art.

Each eligible device (station) in a network may configure an announce message including reference time information thereof and transmit the announce message to other devices. In this case, a device having a best-quality clock may be selected as a grandmaster. That is, when each device receives announce messages from the other devices, each device may compare reference time information thereof to reference time information included in the received announce messages and select a device having the highest priority and accuracy as a grandmaster thereof. If a reference time of the device is more accurate than those of the other devices, the device may determine itself as a grandmaster.

All ports of the device selected as the grandmaster transmit the reference time information to other devices. Hereinafter, for convenience of explanation, a port used to transmit reference time information of a grandmaster is defined as a master port. Wherein, a port of another device connected to the master port and receiving the reference time information of the grandmaster is defined as a slave port.

As illustrated in FIG. 3, when each device receives the announce message, each device may compare the reference time information thereof, e.g., grandmasterIdentity, grandmasterPriority1, clockclass, clockAccuracy, offsetScaledLogVariance, grandmasterPriority2, grandmasterIdentity, StepRemoved or SourcePortIdentity, to the reference time information of the announce message and determine which device is a grandmaster. For example, if device A determines itself as a grandmaster, device A assigns all ports thereof as master ports. Otherwise, if device A determines another device as a grandmaster, device A assigns all ports thereof as slave ports.

Figure 4:
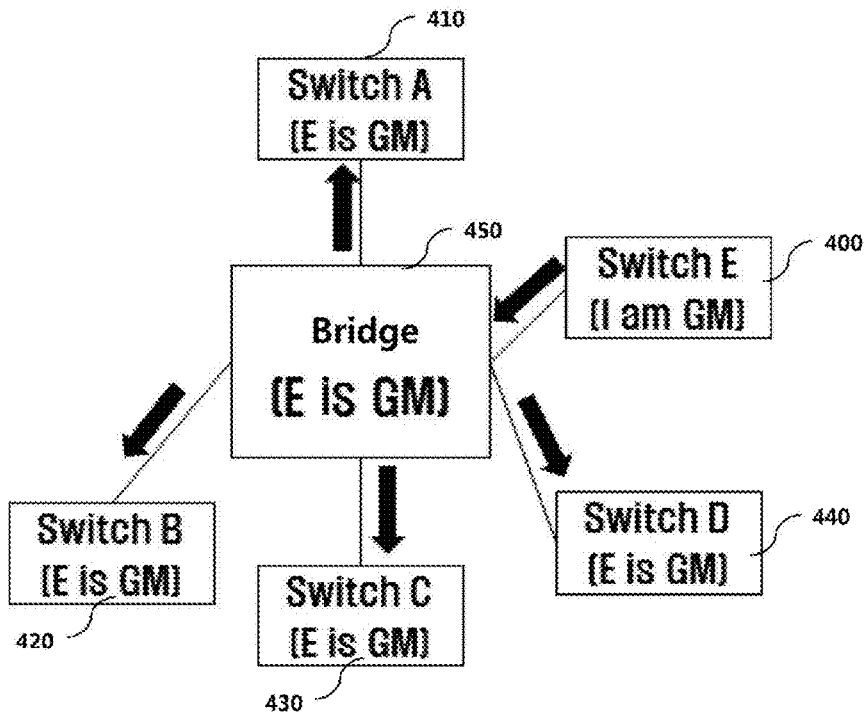
FIG. 4 is a diagram for describing a time synchronization procedure in IEEE 802.1AS according to the related art.

FIG. 4 is a diagram for describing a time synchronization procedure in IEEE 802.1AS according to the related art.

Specifically, FIG. 4 is a diagram for describing a time synchronization procedure in a star topology network structure using a bridge.

In general, the bridge is a network connection device capable of interconnecting two local area networks (LANs), and operates on a data link layer of an open systems interconnection (OSI) reference model.

The bridge may be used, for example, (1) to extend a range and length of a network, (2) to connect a larger number of devices to a network, (3) to reduce a bottleneck situation caused by an excessive number of devices connected to the network, (4) to interconnect networks configured by different physical media (communication lines), and (5) to connect network structures having different topologies such as Ethernet and a token ring.

Referring to FIG. 4, when a switch E 400 is selected as a grandmaster through an initial time synchronization procedure, the switch E 400 may periodically generate an announce message including reference time information thereof and transmit the announce message to a bridge 450. Subsequently, the bridge 450 may deliver the received announce message to switches A 410, B 420, C 430, and D 440.

Alternatively, the bridge 450 may analyze time information included in received announce messages, identify a switch providing the most accurate time information, and control only the announce message received from the identified switch to be delivered to slave nodes.

Figure 5:
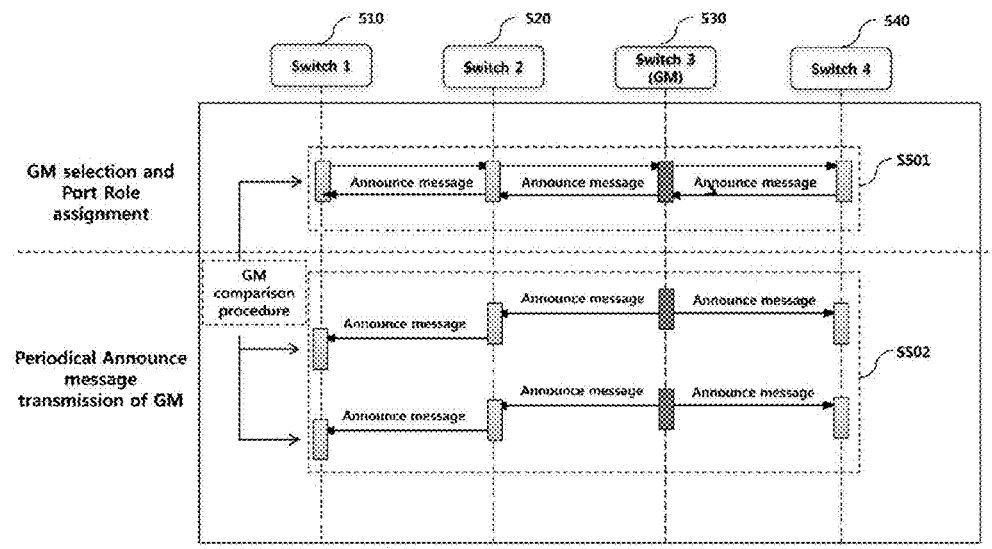
FIG. 5 is a flowchart for describing a grandmaster selection and an announce message transmission procedure according to the related art.

FIG. 5 is a flowchart for describing a grandmaster selection and an announce message transmission procedure according to the related art.

Referring to FIG. 5, each of a switch 1 510 to a switch 4 540 transmits an announce message to switches connected thereto, selects a grandmaster through a reference time information comparison procedure, and assigns a role of ports thereof based on a selection result (S501).

As illustrated in FIG. 5, when the switch 3 530 is selected as a grandmaster, the switch 3 530 generates the announce message periodically (e.g., in a cycle of 1 sec.) and transmits the announce message through master ports to the switch 2 520 and the switch 4 540. Then, the switch 2 520 delivers the received announce message through a slave port thereof to the switch 1 510 (S502). That is, a device selected as the grandmaster may notify presence of the grandmaster and a reference time thereof to other devices using the announce message.

Figure 6:
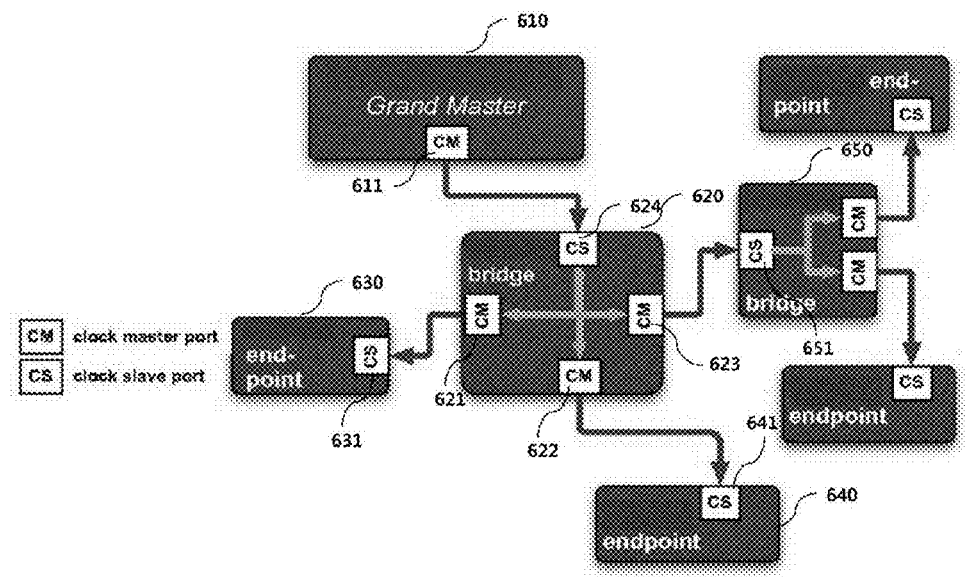
FIG. 6 is a diagram for describing a time synchronization method among nodes based on IEEE 802.1AS.

FIG. 6 is a diagram for describing a time synchronization method among nodes based on IEEE 802.1AS.

Referring to FIG. 6, a grandmaster 610 transmits a sync message and a correcting follow up message (hereinafter simply referred to as a follow up message) through a clock master port 611 to a clock slave port 624 of a bridge 620.

Subsequently, the bridge 620 transmits time correction information based on cable and bridge delays through clock master ports 621, 622, and 623 to clock slave ports 631, 641, and 651 of other devices (end-points 630 and 640 and a bridge 650).

Here, the time correction information may include link delay information, propagation time delay information, neighbor rate ratio information, correction field information, etc.

A calculation method of the time correction information will be described in detail below with reference to the subsequent drawings.

Figure 7:
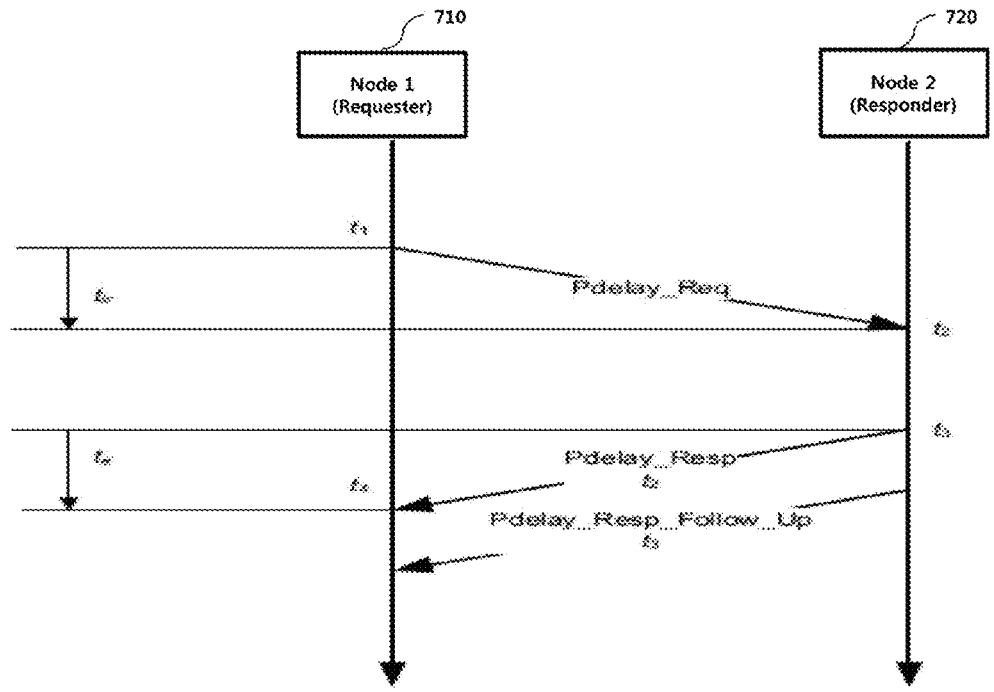
FIG. 7 is a flowchart for describing a link delay calculation method based on IEEE 802.1AS.

FIG. 7 is a flowchart for describing a link delay calculation method based on IEEE 802.1AS.

As illustrated in FIG. 7, a node 1 (requester) 710 transmits a path delay request signal to a node 2 (responder) 720 at a time t1. In this case, the path delay request signal may be received by the node 2 720 at a time t2.

The node 2 720 transmits a path delay response signal including t2 information to the node 1 710 at a time t3. In this case, the path delay response signal may be received by the node 1 710 at a time t4.

Subsequently, the node 2 720 transmits a path delay response follow up signal including t3 information to the node 1 710.

In this case, a link delay between the node 1 710 and the node 2 720 may be calculated as given by Equation (1).

$$[(t4-t1)-(t3-t2)]/2 \quad \text{Equation (1):}$$

Figure 8:
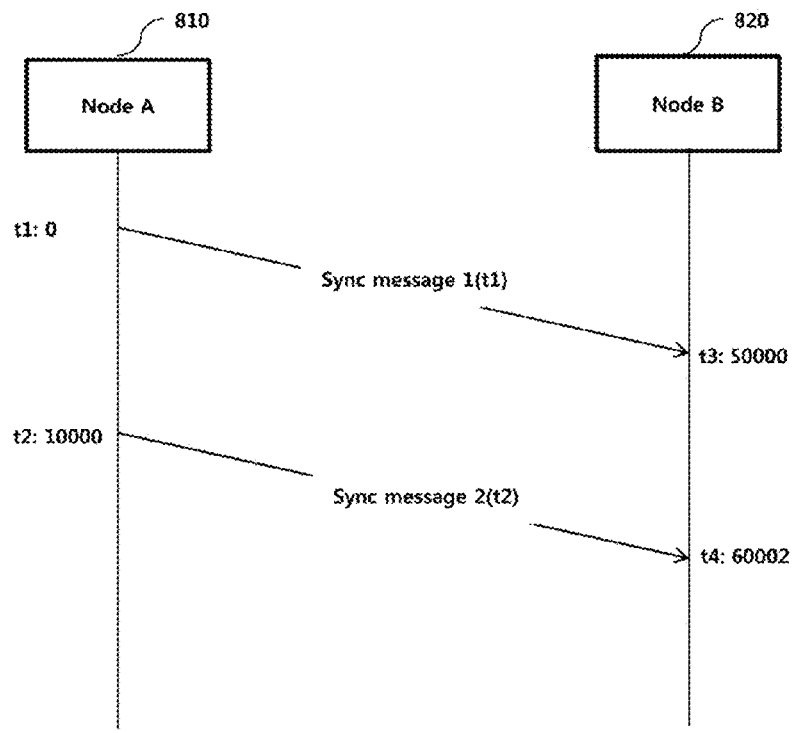
FIG. 8 is a flowchart for describing a neighbor rate ratio calculation method based on IEEE 802.1AS.

FIG. 8 is a flowchart for describing a neighbor rate ratio calculation method based on IEEE 802.1AS.

Referring to FIG. 8, a node A 810 transmits a sync message 1 including transmission timing (t1) information of the sync message 1 to a node B 820.

Subsequently, the node A 810 transmits a sync message 2 including transmission timing (t2) information of the sync message 2 to the node B 820. Here, the sync message 2 may be a follow up message transmitted after the sync message 1.

In this case, if the sync message 1 and the sync message 2 are received by the node B 820 at the times t3 and t4, respectively, a neighbor rate ratio between the node A 810 and the node B 820 may be calculated as given by Equation (2).

$$(t2-t1)/(t4-t3) \quad \text{Equation (2):}$$

If the values of t1, t2, t3, and t4 are 0, 10000, 50000, and 60002, respectively, the neighbor rate ratio has a value of about 0.998 based on (10000−0)/(60002−50000). That is, when a link delay is a constant, the node B 820 which is a neighbor node has a time delay of 2000 parts per million (PPM) or 0.02% compared to the node A 810.

Figure 9:
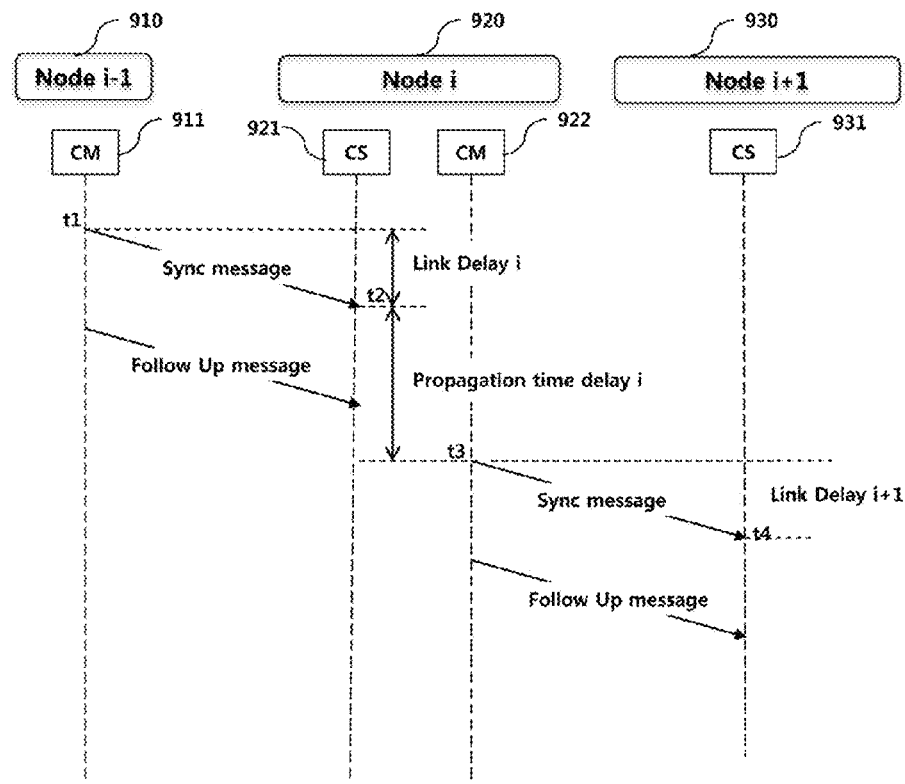
FIG. 9 is a flowchart for describing a time synchronization acquisition procedure among nodes based on IEEE 802.1AS.

FIG. 9 is a flowchart for describing a time synchronization acquisition procedure among nodes based on IEEE 802.1AS.

As illustrated in FIG. 9, a node i−1 910 transmits a sync message through a clock master port 911 thereof at a time t1. In this case, a node i 920 receives the sync message through a clock slave port 921 thereof at a time t2, and transmits the sync message through a clock master port 922 thereof at a time t3 after a propagation time delay i.

Subsequently, a node i+1 930 may receive the sync message through a clock slave port 931 thereof at a time t4.

In addition, the node i−1 910 transmits a follow up message through the clock master port 911 thereof after a set time elapses from when the sync message is transmitted. In this case, the follow up message may include time stamp information, correction field information, neighbor rate ratio information, etc. which are measured and/or calculated by the node i−1 910. Subsequently, when the node i 920 receives the follow up message through the clock slave port 921 thereof, the node i 920 updates the time stamp information, the correction field information, and the neighbor rate ratio information based on the received follow up message, and transmits the follow up message including the updated information through the clock master port 922 thereof.

The node i+1 930 may acquire time synchronization based on the sync message and the follow up message received through the clock slave port 931 thereof.

Figure 10:
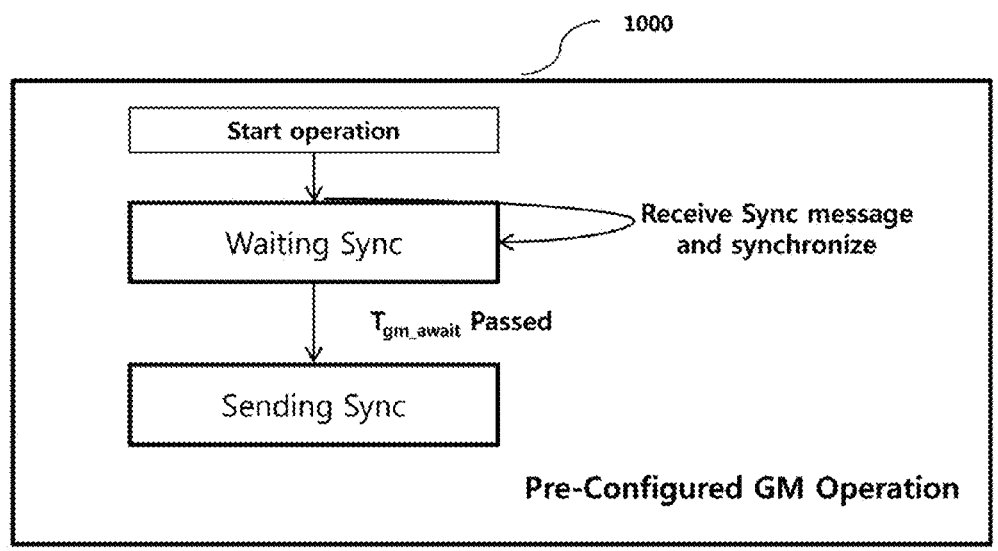
FIG. 10 is a diagram for describing operation of a grandmaster in a pre-configured grandmaster mode according to the related art.

FIG. 10 is a diagram for describing operation of a grandmaster 1000 in a pre-configured grandmaster mode according to the related art.

Referring to FIG. 10, the grandmaster 1000 starts operation and then waits by a time Tgm_await before transmitting an initial sync message.

If a sync message is received from a neighbor bridge before the wait time expires, the grandmaster 1000 corrects a reference time thereof using the sync message.

Otherwise, if a sync message is not received from a neighbor bridge before the wait time expires, the grandmaster 1000 generates and transmits the sync message based on the reference time thereof.

Figure 11:
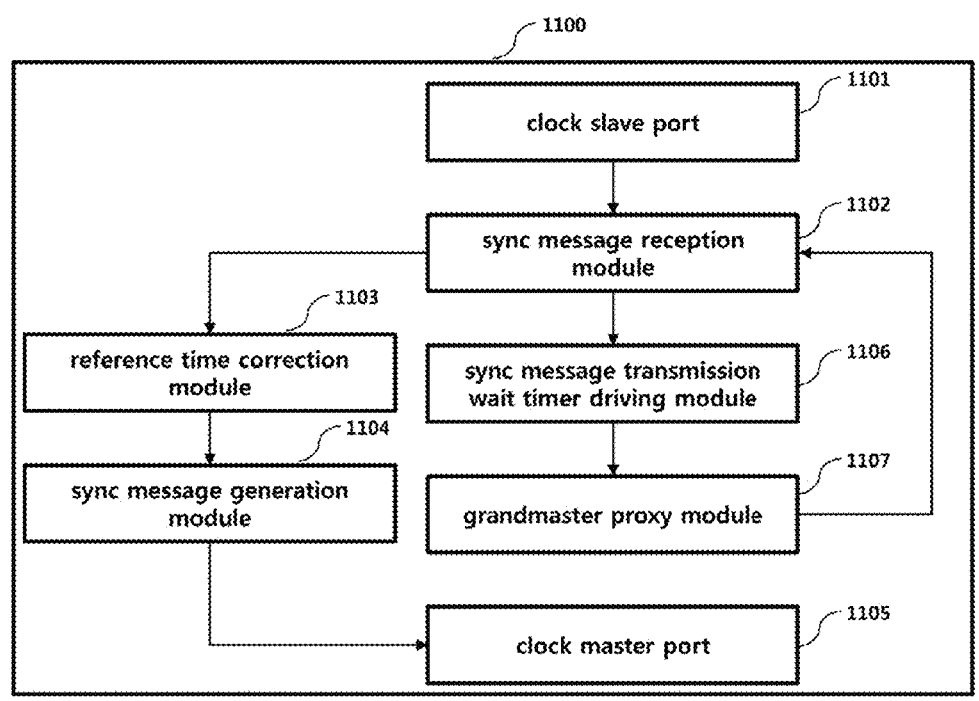
FIG. 11 is a diagram for describing operation of a redundant grandmaster according to an embodiment of the present inventive concept.

FIG. 11 is a diagram for describing operation of a redundant grandmaster according to an embodiment of the present inventive concept.

If a sync message is not received within a predefined maximum sync message reception wait time, a redundant grandmaster 1100 waits for a time obtained by adding a certain offset to the maximum sync message reception wait time (hereinafter referred to as a "sync message transmission wait time"). For example, the offset may be a time corresponding to 1000 times a correction field of the lastly received follow up message. In addition, the maximum sync message reception wait time may be a certain number of a sync message transmission cycle (SyncInterval) of a grandmaster. For example, the maximum sync message reception wait time may be SyncInterval*3.

In this case, the reason why the redundant grandmaster 1100 further waits by the offset value is to prevent simultaneous transmission of sync messages by all bridges spaced far apart from the grandmaster, and to control only the nearest bridge to the grandmaster to transmit a sync message.

When the sync message transmission wait time has passed, a grandmaster proxy of the redundant grandmaster 1100 generates and transmits a sync message in a cycle less than Tgm_await (e.g., Tgm_await/3). Accordingly, the redundant grandmaster 1100 may rapidly correct a reference time thereof when the grandmaster is rebooted.

A detailed description is now given of a synchronization acquisition procedure of the redundant grandmaster 1100 according to the present disclosure.

Referring to FIG. 11, the redundant grandmaster 1100 may include a clock slave port 1101, a sync message reception module 1102, a reference time correction module 1103, a sync message generation module 1104, a clock master port 1105, a sync message transmission wait timer driving module 1106, a grandmaster proxy module 1107, etc.

In a normal bridge mode, the sync message reception module 1102 may receive a sync message and a follow up message transmitted by the grandmaster through the clock slave port 1101.

If a sync message is received before the maximum sync message reception wait time expires, the sync message reception module 1102 may deliver the sync message and a follow up message corresponding to the sync message to the reference time correction module 1103.

The reference time correction module 1103 may generate time correction information based on the received sync message and the follow up message, and transmit the generated time correction information to the sync message generation module 1104. Here, the time correction information may include time stamp information indicating sync message transmission and reception timings, correction field information, neighbor rate ratio information, etc.

The sync message generation module 1104 may generate a sync message and a follow up message including the time correction information, and sequentially transmit the sync message and the follow up message to the clock master port 1105.

In the normal bridge mode, if the sync message is not received before the maximum sync message reception wait time expires, the sync message reception module 1102 may switch an operation mode of the corresponding bridge from the normal bridge mode to a redundant grandmaster mode. That is, the sync message reception module 1102 may sense a loss of the grandmaster.

If the operation mode is switched to the redundant grandmaster mode, the sync message reception module 1102 may transmit a set control signal for driving a sync message transmission wait timer to the sync message transmission wait timer driving module 1106.

When the driven sync message transmission wait timer expires, the sync message transmission wait timer driving module 1106 may transmit a set event signal for indicating expiration of the timer to the grandmaster proxy module 1107.

When the event signal is sensed, the grandmaster proxy module 1107 may generate a sync message in a cycle less than Tgm_await and transmit the sync message to the sync message reception module 1102. For example, Tgm_await may be 30 ms, and the grandmaster proxy module 1107 may generate a sync message in a cycle of 10 ms and transmit the sync message to the sync message reception module 1102.

After that, if the grandmaster is completely rebooted and thus a sync message is received through the clock slave port 1101, the sync message reception module 1102 may switch to the normal bridge mode from the redundant grandmaster mode.

Therefore, a bridge according to the present disclosure may autonomously generate a sync message while a grandmaster is being rebooted, acquire self-synchronization based on the autonomously generated sync message, and transmit the sync message to neighbor nodes to synchronize a whole vehicle network system irrespective of the loss of the grandmaster.

Furthermore, since a standard time based on a global positioning system (GPS) is not used while the grandmaster is being rebooted, a reference time in a vehicle network greatly does not vary (i.e., reference time jump).

In addition, when the sync message is not received by the nearest bridge to a current grandmaster for a reference time, the bridge may be switched to the redundant grandmaster mode as a substitute for the existing grandmaster, and thus, a new grandmaster selection procedure may not be necessary when the grandmaster is rebooted.

An operation of the bridge according to the present disclosure is now described based on numerical assumptions.

Assumption 1: A time at which the bridge most recently receives a sync message from the grandmaster=>1970-01-01 02:00:00.000000000

Assumption 2: A value (a) of CorrectionField most recently received by the nearest bridge to a grandmaster=>0

Assumption 3: A sync message transmission cycle (b) of the grandmaster and the maximum number (c) of waits for reception=>b: 3 sec. and c: 3

Assumption 4: A sync message transmission wait time of the bridge=>Tgm-await: 30 ms Assumption 5: Rebooting starts immediately after the grandmaster transmits the sync message According to Assumptions 1 to 5, the bridge may recognize a loss of the grandmaster after [(b*c)+CorrectionField*1000] from when the last sync message is received.

The bridge then autonomously generates a sync message every Tgm-await/3 (i.e., every 10 ms) and transmits the autonomously generated sync message through a clock master port thereof to neighbor nodes.

If the grandmaster is completely rebooted after 20 sec., the bridge may receive a sync message through a clock slave port thereof. In this case, a timing at which the sync message is received may be 1970-01-01 02:00:20.010000000.

The bridge may transmit a subsequent sync message through the clock master port at a timing of 1970-01-01 02:00:20.030000000.

As is apparent from the above description, the method and apparatus according to the present disclosure have the following effects.

The method and apparatus for providing in-vehicle network time synchronization using a redundant grandmaster according to the present disclosure can prevent initialization of a reference time when a grandmaster is rebooted.

Further, the method and apparatus for providing in-vehicle network time synchronization using a redundant grandmaster according to the present disclosure operate the nearest bridge to a grandmaster as the redundant grandmaster when the grandmaster is rebooted, and thus, a new grandmaster selection procedure may not be necessary.

In addition, the method and apparatus for providing in-vehicle network time synchronization using a redundant grandmaster according to the present disclosure more rapidly and stably acquire time synchronization when a system failure of an in-vehicle network occurs.

Each of the sync message reception module 1102, the reference time correction module 1103, the sync message generation module 1104, the sync message transmission wait timer driving module 1106, and the grandmaster proxy module 1107 may be implemented as independent hardware. Alternatively, some or all of the elements may be selectively combined into a computer program having a program module performing some or all functions combined in one or more pieces of hardware. Code and code segments constituting the computer program may be easily reasoned by those skilled in the art to which the present disclosure pertains.

It will be appreciated by persons skilled in the art that the effects that could be achieved through the present disclosure are not limited to what has been particularly described hereinabove and other advantages of the present disclosure will be more clearly understood from the above detailed description.

Those skilled in the art will appreciate that the present invention may be carried out in other specific ways than those set forth herein without departing from the spirit and essential characteristics of the present disclosure.

The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for providing time synchronization in a bridge switch lined via a clock slave port with a grandmaster device, the method comprising steps of:
   sensing a loss of the grandmaster device based on a message transferred via the clock slave port;
   generating a sync message based on an internal reference time of the bridge switch according to a sensed result; and
   transmitting the generated sync message through a clock master port,
   wherein the bridge switch waits for a sync message transmission wait time before generating the sync message if the loss is sensed, and
   wherein the sync message transmission wait time is determined as a sum of the time corresponding to a predetermined number of the sync message transmission cycles of the grandmaster device and a predetermined multiple of a correction field value which is a most recently received value from the grandmaster device.

2. The method according to claim 1, wherein the loss of the grandmaster device is sensed if the sync message is not received from the grandmaster device for a time corresponding to the predetermined number of sync message transmission cycles.

3. The method according to claim 1, further comprising a step of generating time correction information using the generated sync message and a follow up message which is most recently received from the grandmaster device.

4. The method according to claim 3, wherein the step of generating the time correction information comprises steps of:
   generating the follow up message comprising the generated time correction information; and
   transmitting the generated follow up message through the clock master port,
   wherein the generated follow up message is transmitted after the generated sync message is transmitted.

5. The method according to claim 3, wherein the time correction information comprises at least one of time stamp information, correction field information, and neighbor rate ratio information.

6. The method according to claim 1, wherein an operation mode of the bridge switch is switched from a normal bridge mode to a redundant grandmaster mode if the loss is sensed.

7. The method according to claim 6, wherein the operation mode is switched back to the normal bridge mode if the sync message is received from the grandmaster device in the redundant grandmaster mode.

8. The method according to claim 6, wherein the sync message is generated and transmitted in the redundant grandmaster mode in a cycle less than the sync message transmission cycles of the grandmaster device.

9. A bridge switch linked via a clock slave port with a grandmaster device, the bridge switch comprising:
   a sync message reception module configured to sense a loss of the grandmaster device based on a message transferred via the clock slave port; and
   a sync message generation module configured to generate a sync message based on an internal reference time of the bridge switch according to a sensed result, and to transmit the generated sync message through a clock master port,
   wherein the bridge switch waits for a sync message transmission wait time before generating the sync message if the loss is sensed, and
   wherein the sync message transmission wait time is determined as a sum of the time corresponding to a predetermined number of the sync message transmission cycles of the grandmaster device and a predetermined multiple of a correction field value which is a most recently received value from the grandmaster device.

10. The bridge switch according to claim 9, wherein the loss of the grandmaster device is sensed if the sync message is not received from the grandmaster device for a time corresponding to the predetermined number of sync message transmission cycles.

11. The bridge switch according to claim 9, further comprising a reference time correction module configured to generate time correction information using the generated sync message and a follow up message which is most recently received from the grandmaster device.

12. The bridge switch according to claim 11, wherein the sync message generation module is further configured to:
    generate the follow up message comprising the generated time correction information; and
    transmit the generated follow up message through the clock master port,
    wherein the generated follow up message is transmitted after the generated sync message is transmitted.

13. The bridge switch according to claim 11, wherein the time correction information comprises at least one of time stamp information, correction field information, and neighbor rate ratio information.

14. The bridge switch according to claim 9, wherein the sync message reception module switches an operation mode of the bridge switch from a normal bridge mode to a redundant grandmaster mode if the loss is sensed.

15. The bridge switch according to claim 14, wherein the sync message reception module switches the operation mode back to the normal bridge mode if the sync message is received from the grandmaster device in the redundant grandmaster mode.

16. The bridge switch according to claim 14, wherein the sync message is generated and transmitted in the redundant grandmaster mode in a cycle less than the sync message transmission cycles of the grandmaster device.

17. The bridge switch according to claim 9, wherein the sync message reception module transmits a control signal for driving a sync message transmission wait timer to a sync message transmission wait timer driving module.

18. The bridge switch according to claim 17, wherein, when the driven sync message transmission wait timer expires, the sync message transmission wait timer driving module transmits an event signal for indicating expiration of the timer to a grandmaster proxy module.

19. The bridge switch according to claim 18, wherein, when the event signal is sensed, the grandmaster proxy module generates a sync message in a cycle less than the driven sync message transmission wait timer and transmits the sync message to the sync message reception module.

20. A non-transitory computer-readable recording medium comprising computer executable instructions of which cause the bridge switch to perform the method according to claim 1.

\* \* \* \* \*